(12) United States Patent
Narumi et al.

(10) Patent No.: US 8,422,341 B2
(45) Date of Patent: Apr. 16, 2013

(54) DEVICE AND METHOD FOR RECORDING AND/OR REPRODUCING DATA ONTO/FROM INFORMATION RECORDING MEDIUM BY USING NEAR-FIELD LIGHT AND INFORMATION RECORDING MEDIUM

(75) Inventors: Kenji Narumi, Osaka (JP); Masahiro Birukawa, Osaka (JP)

(73) Assignee: Panasonic Corporation, Osaka (JP)

( * ) Notice: Subject to any disclaimer, the term of this patent is extended or adjusted under 35 U.S.C. 154(b) by 661 days.

(21) Appl. No.: 12/596,937

(22) PCT Filed: Apr. 22, 2008

(86) PCT No.: PCT/JP2008/001054
§ 371 (c)(1),
(2), (4) Date: Oct. 21, 2009

(87) PCT Pub. No.: WO2008/132838
PCT Pub. Date: Nov. 6, 2008

(65) Prior Publication Data
US 2010/0118665 A1  May 13, 2010

(30) Foreign Application Priority Data

Apr. 24, 2007 (JP) .................................. 2007-113718

(51) Int. Cl.
*G11B 7/00* (2006.01)
(52) U.S. Cl.
USPC .................. 369/13.33; 369/13.13; 369/13.34; 369/44.27; 369/44.29
(58) Field of Classification Search .......................... None
See application file for complete search history.

(56) References Cited

U.S. PATENT DOCUMENTS

| | | | |
|---|---|---|---|
| 6,404,710 | B1 | 6/2002 | Ichimura et al. |
| 2001/0017823 | A1* | 8/2001 | Ishihara ........................ 369/32 |

(Continued)

FOREIGN PATENT DOCUMENTS

| | | |
|---|---|---|
| JP | 2001-023284 | 1/2001 |
| JP | 2001-143260 | 5/2001 |

(Continued)

OTHER PUBLICATIONS

Supplementary European Search Report for corresponding European Application No. 08738624.9 dated Nov. 18, 2010.

(Continued)

*Primary Examiner* — Wayne Young
*Assistant Examiner* — Dionne Pendleton
(74) *Attorney, Agent, or Firm* — Renner, Otto, Boisselle & Sklar, LLP (57) ABSTRACT

An apparatus 100 according to the present invention is designed to read and/or write data from/on an information recording medium 1 using near-field light. The apparatus 100 includes: a light source 3 for emitting laser light; a condensing section 7 for producing the near-field light based on the laser light; a detecting section 22, 23 for detecting the relative positions of the condensing section 7 and the information recording medium 1; and a control section 14 for controlling the position of the condensing section 7. In starting a gap servo operation, the control section 14 controls the position of the condensing section 7 so that the gap servo operation is started at a different location on the information recording medium 1 from any other location where the gap servo operation has ever been started.

18 Claims, 4 Drawing Sheets

U.S. PATENT DOCUMENTS

| | | | |
|---|---|---|---|
| 2001/0021145 A1 | 9/2001 | Ichimura et al. | |
| 2002/0027869 A1* | 3/2002 | Morita et al. | 369/275.4 |
| 2002/0163869 A1 | 11/2002 | Ishimoto | |
| 2004/0013077 A1 | 1/2004 | Saito et al. | |
| 2004/0156294 A1 | 8/2004 | Watanabe et al. | |
| 2004/0246877 A1* | 12/2004 | Ishizaki et al. | 369/112.23 |
| 2005/0047310 A1* | 3/2005 | Kan | 369/112.01 |
| 2005/0083598 A1* | 4/2005 | Seo et al. | 360/59 |
| 2006/0187813 A1* | 8/2006 | Nakamura et al. | 369/275.3 |
| 2006/0274610 A1 | 12/2006 | Saito et al. | |
| 2006/0274625 A1* | 12/2006 | Nakamura et al. | 369/59.23 |
| 2006/0280063 A1 | 12/2006 | Ishimoto | |
| 2008/0198728 A1* | 8/2008 | Watanabe | 369/112.23 |

FOREIGN PATENT DOCUMENTS

| | | |
|---|---|---|
| JP | 2001-236663 | 8/2001 |
| JP | 2002-123981 | 4/2002 |
| WO | 02/086873 | 10/2002 |
| WO | 03/021583 | 3/2003 |
| WO | 2007/034811 | 3/2007 |

OTHER PUBLICATIONS

Zijp et al., "Near field read-out of a 50 GB first-surface disk with NA=1.9 and a proposal for a cover-layer incident, dual-layer near field system", Proceedings of the International Society for Optical Engineering (SPIE), vol. 5380, No. 1, Jan. 1, 2004 pp. 209-223, XP002432408.

International Search Report for corresponding application No. PCT/JP2008/001054 mailed Aug. 12, 2008.

Form PCT/IPEA/409 and a partial English translation.

Form PCT/IPEA/409 and a partial English translation for corresponding application No. PCT/JP2008/001054 dated Aug. 12, 2008.

* cited by examiner

DEVICE AND METHOD FOR RECORDING AND/OR REPRODUCING DATA ONTO/FROM INFORMATION RECORDING MEDIUM BY USING NEAR-FIELD LIGHT AND INFORMATION RECORDING MEDIUM

TECHNICAL FIELD

The present invention relates to an apparatus and method for reading and/or writing data from/on an information recording medium using near-field light and also relates to an information recording medium for use in such an apparatus and method.

BACKGROUND ART

A technique using near-field light has been proposed as a method for reading and writing data from/on an optical disc medium with even higher density.

An optical system including a condenser lens and a solid immersion lens (which will be abbreviated herein as an "SIL") in combination has recently attracted a lot of attention as a condensing means that produces near-field light. By using such a combination, a numerical aperture (NA) that is higher than that of a condenser lens can be achieved. Generally speaking, the higher the NA of an optical system, the smaller the spot size and the data can be stored with high density.

When a read/write operation is performed on an optical disc medium using an SIL, the gap between the SIL and the surface of the optical disc medium should be very narrow. In an optical system for use in DVDs (digital versatile discs), for example, there is a gap of approximately 1 mm between the objective lens and the surface of the optical disc medium. When an SIL is used, however, the gap between the emission plane of the SIL and the surface of the optical disc medium should be approximately 100 nm or less. If the gap between the SIL and the surface of the optical disc medium varied significantly, then the near-field light could fail to reach the surface of the optical disc medium or the SIL might collide against the optical disc medium. That is why a control needs to be performed to keep the gap between the SIL and the surface of the optical disc medium as constant as possible.

To get such a control done, a method called "gap servo" has been proposed in Patent Document No. 1, for example. According to that method, the intensity of a particular polarization component of the near-field light that has been reflected from the optical disc medium is detected and the positions of a condenser lens and an SIL in the optical axis direction are adjusted actively by an actuator to keep the intensity constant, thereby controlling the interval (or the gap) between the SIL and the optical disc medium.

In a normal recorder/player, the gap between the SIL and the surface of the disc should start to be controlled at a point in time after the recorder/player that has been turned ON has been loaded with the disc and before information is read or written from/on it. In conventional optical disc media such as DVDs, this operation corresponds to the operation of starting a focus control.

In conventional optical disc media, it is natural that the disc needs to be rotated when the focus control is started. This is because if the disc stayed put, a particular portion of the storage layer of the disc would be irradiated with, and locally heated by, a condensed laser beam continuously. In that case, the information stored in that particular portion might be erased or the storage layer or any other thin layer could deteriorate.

Nevertheless, once the gap has been controlled, the gap between the SIL and the surface of the optical disc medium should be as narrow as 100 nm or less. If the SIL has once been moved sufficiently away from, or has once contacted with, the surface of the optical disc medium, an extremely sophisticated technique would be required to provide a gap of 100 nm or less again between them. This is because if the movement of the SIL had even a small degree of overshoot or undershoot when it starts to be moved, the SIL might collide against the surface of the optical disc medium.

That is why before the gap control operation is started, various disturbance factors should be eliminated as much as possible. Once a disc has started rotating, the surface position of the disc in the optical axis direction will vary with time due to the disc flutter (or out-of-plane vibrations) or the unevenness of the surface. As such a variation constitutes a disturbance for the control operation, the control operation could be started with the disc kept stopped. Patent Document No. 2 discloses a method for controlling the gap between the SIL and the disc surface with the disc stopped. According to such a method, the gap is controlled by detecting electrostatic capacitance between the SIL and the disc surface, and therefore, there is no need to irradiate the disc surface with laser light for control purposes.

Patent Document No. 1: Pamphlet of PCT International Application Publication No. 03/021583
Patent Document No. 2: Japanese Patent Application Laid-Open Publication No. 2001-23284

DISCLOSURE OF INVENTION

Problems to be Solved by the Invention

However, there are some problems with the conventional methods described above.

Specifically, according to the method disclosed in Patent Document No. 1, if the gap servo was started while the disc is rotating, the SIL would collide against the disc surface easily due to the disc flutter or the surface unevenness of the disc, which is a problem. Nevertheless, if the gap servo was started while the disc stops, a particular portion of the storage layer of the disc would be locally heated continuously. And the information stored in that particular portion might be erased or the storage layer or any other thin layer could deteriorate as described above.

On top of that, in that particular deteriorated portion, its properties such as the reflectance and the shape of the thin film layer have varied. That is why even if the gap servo is tried on that particular portion by irradiating it with laser light before the next gap servo is started, the gap servo might fail sometimes.

On the other hand, according to the technique disclosed in Patent Document No. 2, an electrode should be provided for the SIL in order to detect the electrostatic capacitance, thus complicating the structure of the optical head and increasing the manufacturing cost of the apparatus, which is also a problem.

It is therefore an object of the present invention to get a gap servo done using a simple configuration without erasing stored information by mistake. Another object of the present invention is to provide an apparatus and method for getting a new gap servo operation done normally even if the portion that was irradiated with laser light during a past gap servo operation has deteriorated.

Means for Solving the Problems

An apparatus according to the present invention is designed to read and/or write data from/on an information recording medium using near-field light. The apparatus includes: a light source for emitting laser light; a condensing section for producing the near-field light based on the laser light; a detecting section for detecting the relative positions of the condensing section and the information recording medium; and a control section for controlling the position of the condensing section. The apparatus is characterized in that in starting a gap servo operation, the control section controls the position of the condensing section so that the gap servo operation is started at a different location on the information recording medium from any other location where the gap servo operation has ever been started.

In one preferred embodiment, the apparatus further includes a storage section for memorizing the locations where the gap servo operation has been started so far. In starting the gap servo operation, the control section calls up the locations that are memorized by the storage section and controls the position of the condensing section so that the gap servo operation is started at a different location from any of the locations that have been called up from the storage section.

In another preferred embodiment, in starting the gap servo operation, the control section controls the position of the condensing section so that the gap servo operation is started at a different radial location from any other location where the gap servo operation has ever been started.

In still another preferred embodiment, in starting the gap servo operation, the control section controls the position of the condensing section so that the gap servo operation is started at a different circumferential location from any other location where the gap servo operation has ever been started.

In yet another preferred embodiment, the control section starts the gap servo operation while the information recording medium is not rotating but stopped.

In yet another preferred embodiment, when the gap servo operation is started, the light source starts emitting the laser light with the information recording medium stopped.

In yet another preferred embodiment, the apparatus further includes a motor for rotating the information recording medium. When the gap servo operation is started, the motor rotates the information recording medium at a lower velocity than when data is read and/or written from/on the information recording medium.

In yet another preferred embodiment, it is not until the condensing section has reached the location where the gap servo operation is started that the light source starts emitting the laser light.

In yet another preferred embodiment, the control section starts the gap servo operation after having moved the condensing section to a position where the condensing section faces a predetermined area on the information recording medium.

In this particular preferred embodiment, the predetermined area is a management area in which management information is stored to manage the information recording medium.

In an alternative preferred embodiment, the information recording medium has a management area in which management information is stored to manage the information recording medium, and the predetermined area is adjacent to the management area.

Alternatively or additionally, the information recording medium has a management area in which management information is stored to manage the information recording medium and a data area to store user data. The management area is located closer to the inner edge of the information recording medium than the data area is. And the predetermined area is located closer to the inner edge of the information recording medium than the management area is.

In yet another preferred embodiment, the information recording medium is either a write-once recording medium or a rewritable recording medium, and the predetermined area has no recording marks.

In yet another preferred embodiment, the information recording medium is either a write-once recording medium or a rewritable recording medium, and the predetermined area has no grooves.

In yet another preferred embodiment, the information recording medium is a read-only recording medium, and the predetermined area has no recording pits.

In yet another preferred embodiment, the condensing section includes a solid immersion lens.

In yet another preferred embodiment, the intensity of the laser light emitted by the light source is lower when the gap servo operation is started than when data is read from the information recording medium.

A method according to the present invention is designed to read and/or write data from/on an information recording medium using near-field light. The method is characterized by including the steps of: detecting the relative positions of the information recording medium and a condensing section; and controlling, in starting a gap servo operation, the position of the condensing section so that the gap servo operation is started at a different location on the information recording medium from any other location where the gap servo operation has ever been started.

An information recording medium according to the present invention is what data is read from, and/or written on, using near-field light. The recording medium is characterized by having a predetermined area where an apparatus for reading and/or writing the data starts a gap servo operation.

In one preferred embodiment, the predetermined area is a management area in which management information is stored to manage the information recording medium.

In another preferred embodiment, the information recording medium has a management area in which management information is stored to manage the information recording medium. And the predetermined area is adjacent to the management area.

In still another preferred embodiment, the information recording medium has a management area in which management information is stored to manage the information recording medium and a data area to store user data. The management area is located closer to the inner edge of the information recording medium than the data area is. And the predetermined area is located closer to the inner edge of the information recording medium than the management area is.

In yet another preferred embodiment, the information recording medium is either a write-once recording medium or a rewritable recording medium, and the predetermined area has no recording marks.

In yet another preferred embodiment, the information recording medium is either a write-once recording medium or a rewritable recording medium, and the predetermined area has no grooves.

In yet another preferred embodiment, the information recording medium is a read-only recording medium, and the predetermined area has no recording pits.

In yet another preferred embodiment, the information recording medium further includes: a protective layer, which is coated on the surface of the information recording medium; and a data area to store user data. The protective layer has the same refractive index and the same thickness in its portions that cover the predetermined area and the data area, respectively.

Effects of the Invention

According to the present invention, a gap servo operation is started at a different location on an information recording medium from any other location where the gap servo operation has ever been started. Thus, it is possible to prevent the laser light emitted at the beginning of a gap servo operation from irradiating the same particular portion over and over again. As a result, deterioration of the storage layer and other thin-film layers of the recording medium can be minimized.

In addition, even if any particular portion of the information recording medium deteriorated when the gap servo operation was started in the past, the new gap servo operation is started at a different location from that particular deteriorated portion, and therefore, can get done just as intended.

On top of that, the configuration of the optical head can be simplified, and therefore, the manufacturing cost of the apparatus can be reduced.

What is more, according to a preferred embodiment of the present invention, locations on an information recording medium where a gap servo operation has been started so far are memorized by a storage section, thus making it possible to determine accurately and easily where the gap servo operation has been started so far.

Also, according to a preferred embodiment of the present invention, the gap servo operation is started at a different radial location from any other location where the gap servo operation has ever been started. Thus, the location where the gap servo operation is newly started can never be the same as any other location where the gap servo operation has ever been started.

Furthermore, according to a preferred embodiment of the present invention, the gap servo operation is started at a different circumferential location from any other location where the gap servo operation has ever been started. Thus, the location where the gap servo operation is newly started can never be the same as any other location where the gap servo operation has ever been started.

Moreover, according to a preferred embodiment of the present invention, the gap servo operation is started while the information recording medium is not rotating but stopped. And in another preferred embodiment, laser light starts being emitted while the information recording medium is not rotating but stopped. By keeping the information recording medium stopped, it is possible to prevent the surface position of the information recording medium in the optical axis direction from varying with time due to the out-of-plane vibrations or the surface unevenness of the information recording medium. As a result, the gap servo operation can get started with even more stability. On top of that, even if the condensing section has collided against the surface of the information recording medium, it is still possible to prevent the lens or the information recording medium from getting scratched.

Furthermore, according to a preferred embodiment of the present invention, when the gap servo operation is started, the information recording medium is rotated at a lower velocity than when data is read and/or written from/on the information recording medium. By keeping the rotational velocity of the information recording medium low, the surface position of the information recording medium in the optical axis direction will vary at a lower rate due to the out-of-plane vibrations or the surface unevenness of the information recording medium. As a result, the gap servo operation can get started with more stability.

Also, according to a preferred embodiment of the present invention, the light source starts emitting the laser light only after the condensing section has reached the location where the gap servo operation is supposed to be started, not before the gap servo operation is started. By avoiding emitting the laser light until the gap servo operation is actually started, the power dissipation can be cut down in the standby mode or when the apparatus is not used.

Furthermore, according to a preferred embodiment of the present invention, the gap servo operation is started after the condensing section has moved to a position under a predetermined area on the information recording medium. By getting the gap servo operation started within the predetermined area, the information stored will not be erased by mistake. Also, if the gap servo operation is started in an area where no information is stored, no information stored can be erased unintentionally at all.

Furthermore, according to a preferred embodiment of the present invention, the predetermined area on the information recording medium where the gap servo operation is supposed to be started is a management area in which management information is stored to manage the information recording medium. If the management area is also the predetermined area in which the gap servo operation is supposed to be started, the available area on the information recording medium can be used more efficiently.

Meanwhile, according to an alternative preferred embodiment of the present invention, the predetermined area on the information recording medium where the gap servo operation is supposed to be started is an area adjacent to the management area. Then, the management information can be retrieved as soon as the gap servo operation is started. As a result, data can start being read or written more quickly after the apparatus has been turned ON.

Furthermore, according to a preferred embodiment of the present invention, the predetermined area in which the gap servo operation is supposed to be started, the management area, and the data area are arranged in this order outward from the inner edge of the information recording medium. Then, after the gap servo operation has been started, management information can be retrieved and data can be read or written quickly. That is to say, data can start being read or written in a shorter time after the apparatus has been turned ON. In addition, since the predetermined area is arranged close to the inner edge, the gap servo operation can be started in an area where there is a little mechanical vibration due to the rotation of the information recording medium. As a result, the gap servo operation can be started with even more stability.

Also, according to a preferred embodiment of the present invention, the information recording medium is either a write-once recording medium or a rewritable recording medium, and the predetermined area in which the gap servo operation is supposed to be started has no recording marks. Thus, no data stored will be erased by mistake.

Meanwhile, according to an alternative preferred embodiment of the present invention, the information recording medium is either a write-once recording medium or a rewritable recording medium, and the predetermined area in which the gap servo operation is supposed to be started has no grooves. Thus, it is possible to prevent a gap control or a focus control from losing its stability due to diffracted light produced by grooves after the gap servo operation has been started.

According to another alternative preferred embodiment of the present invention, the information recording medium is a read-only recording medium, and the predetermined area in which the gap servo operation is supposed to be started has no recording pits. By getting the gap servo operation started in such an area with no recording pits representing information stored, it is possible to avoid a situation where information stored is erased unintentionally.

Furthermore, according to a preferred embodiment of the present invention, the condensing section includes a solid immersion lens. Then, the numerical aperture (NA) can be increased and a smaller beam spot can be obtained, thus contributing to getting a read/write operation done with more density.

Furthermore, according to a preferred embodiment of the present invention, the intensity of the laser light emitted from the light source when the gap servo operation is started is lower than when data is read from the information recording medium. Then, the thin-film layer of the information recording medium is much less likely to deteriorate when the gap servo operation is started.

Furthermore, according to a preferred embodiment of the present invention, the information recording medium further includes a protective layer, which is coated on the surface of the information recording medium, and a data area to store user data. And the protective layer has the same refractive index and the same thickness in its portions over the predetermined area, in which the gap servo operation is supposed to be started, and over the data area. In that case, even if the condensing section has moved to the data area after having performed the gap servo operation in the predetermined area, there is no need to start the gap servo operation all over again. Thus, it is possible to prevent the data area from deteriorating and to read or write data quickly.

DESCRIPTION OF REFERENCE NUMERALS

| | |
|---|---|
| 1, 401 | optical disc |
| 2 | optical head |
| 3 | laser light source |
| 4 | collimator lens |
| 5 | beam splitter |
| 6 | quarter-wave plate |
| 7 | condensing section |
| 8 | condenser lens |
| 9 | solid immersion lens (SIL) |
| 10 | lens holder |
| 11 | actuator |
| 12 | detector lens |
| 13 | detector |
| 14 | system controller |
| 15 | spindle motor |
| 16 | rotation controller |
| 17 | feed motor |
| 18 | feed controller |
| 19 | laser driver |
| 20 | gap detector |
| 21 | gap controller |
| 22 | angle of rotation detector |
| 23 | radial location detector |
| 24 | storage section |
| 101 | data area |
| 102 | management area |
| 103 | gap servo area |
| 402 | substrate |
| 403 | thin-film layer |
| 404 | protective layer |

BEST MODE FOR CARRYING OUT THE INVENTION

Hereinafter, preferred embodiments of the present invention will be described with reference to the accompanying drawings.

Figure 1:
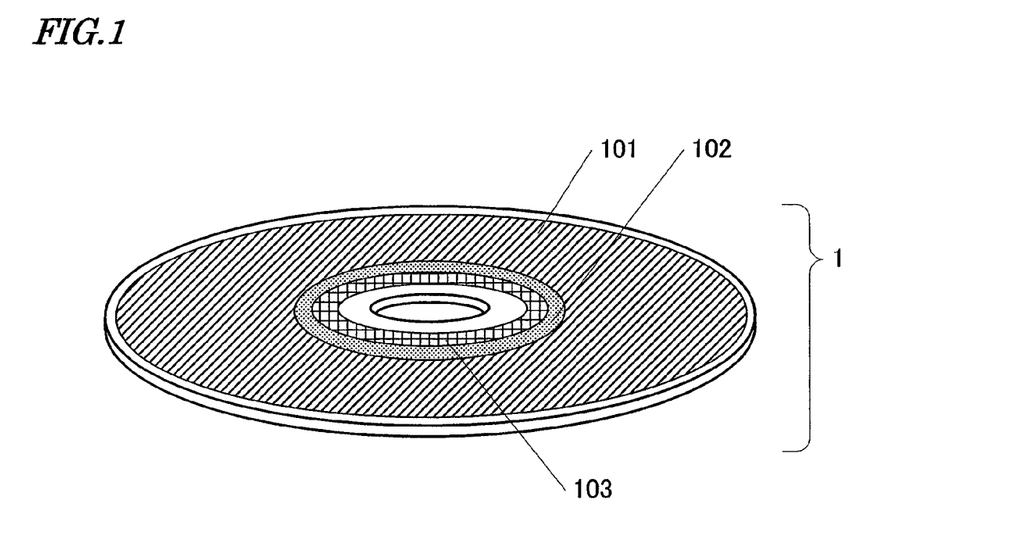
FIG. 1 is a perspective view illustrating an information recording medium as a preferred embodiment of the present invention.

First of all, an information recording medium as a preferred embodiment of the present invention will be described with reference to FIG. 1, which illustrates an information recording medium 1 according to a preferred embodiment of the present invention. The information recording medium 1 is a medium from/on which information is read and/or written optically, and may be a write-once, rewritable or read-only optical disc medium, for example.

The optical disc medium 1 is divided into a number of areas. Specifically, the information recording medium 1 includes a data area 101, a management area 102 and a gap servo area (corresponding to the "predetermined area") 103.

The data area 101 is an area to store a content or user data such as video, audio or text. If the optical disc medium 1 is either a write-once disc or a rewritable disc, recording marks representing data are left in the data area 101. On the other hand, if the optical disc medium 1 is a read-only one, recording pits representing data are left in the data area 101.

In the management area 102, stored is management information to manage the optical disc medium 1. The management information is represented by pits or wobbles that are left in the management area 102. Examples of the management information include information about the type of the given optical disc medium (which may be write-once, rewritable or read-only), and the storage capacity and the recording speed thereof.

The gap servo area 103 is an area where a gap servo operation is supposed to be started. As used herein, the "gap servo operation" means the operation of controlling the position of an optical head so as to leave an appropriate gap between the surface of the optical disc medium 1 and the optical head. And "to start a gap servo operation" means changing from a state in which no gap control is performed to a state in which such a gap control is performed. If a read/write operation is performed using near-field light, the gap servo operation is performed to leave a gap of several nm to 100 nm between the surface of the optical disc medium 1 and the emittance plane of the lens. Such a gap is sometimes called a "near field".

In this optical disc medium 1, the gap servo area 103 is provided separately from the data area 101. If the optical disc medium 1 is either a write-once disc or a rewritable disc, no recording marks representing information shall be left in the gap servo area 103. Thus, it is possible to avoid a situation where data stored is erased by mistake as a result of starting a gap servo operation.

Optionally, the gap servo area 103 could be covered with a different thin-film layer from the one that covers the data area 101. However, if covered with the same thin-film layer, then the gap servo area 103 and the data area 101 can have the same optical property. In that case, even if the condensing section of the optical head has moved to the data area 101 after having started the gap servo operation, the light returning from the data area 101 maintains the same state as the one returning from the gap servo area 103. As a result, the condensing section can be moved with either a gap control or a focus control carried on with good stability.

Optionally, the track structure of the gap servo area 103 may be different from that of the data area 101. For example, if the data area 101 has spiral tracks (or grooves), the gap servo area 103 may have a mirror surface with no grooves or recording pits or may have grooves with no recording pits. If the gap servo area 103 had grooves, however, diffracted light produced by those grooves could be incident on the detector 13 (to be described later) when the gap servo operation is started, thus possibly causing a disturbance on a detection signal to detect either the gap or a focusing state. That is why if the gap servo area 103 has no grooves, such a disturbance can be eliminated. Likewise, even if the optical disc medium 1 is a read-only one, the gap servo area 103 preferably has no recording pits, either.

Hereinafter, an apparatus 100 for reading and/or writing data as a preferred embodiment of the present invention will be described with reference to FIG. 2. The apparatus 100 reads and/or writes data from/on the optical disc medium 1 using near-field light. The apparatus 100 may be a recorder/player, a recorder, a player or an editing system.

The apparatus 100 includes an optical head 2, a system controller 14, a spindle motor 15, a rotation controller 16, a feed motor 17, a feed controller 18, a laser driver 19, a gap detector 20, a gap controller 21, an angle of rotation detector 22, a radial location detector 23 and a storage section 24.

The optical head 2 includes a laser light source 3, a collimator lens 4, a beam splitter 5, a quarter-wave plate 6, a condensing section 7, a detector lens 12, and a detector 13. The condensing section 7 includes a condenser lens 8, an SIL 9, a lens holder 10, and an actuator 11.

The laser light emitted from the laser light source is transformed by the collimator lens 4 into a parallel beam, which passes through the beam splitter 5 and then is transformed by the quarter-wave plate 6 from linearly polarized light into circularly polarized light to enter the condensing section 7.

The condensing section 7 includes the condenser lens 8 and the SIL (solid immersion lens) 9 as two lenses, and produces near-field light on receiving the laser light. The SIL 9 may be a hemispheric lens, for example, which is arranged so that the flat portion thereof is opposed to the surface of the optical disc medium 1. The condenser lens 8 and the SIL 9 are fixed together with the lens holder 10. By getting the condenser lens 8 and the SIL 9 moved together in the optical axis direction by the actuator 11 secured to the lens holder 10, the gap between the surface of the optical disc medium 1 and the SIL 9 can be adjusted. If there is a proper gap between the surface of the optical disc medium 1 and the SIL 9, the near-field light that has been produced at the flat portion of the SIL 9 is incident on, and reflected by, the optical disc medium 1.

The beam splitter 5 also reflects the returning light beams (i.e., the light beam reflected from the optical disc medium 1 and the light beam returning from the flat portion of the SIL 9 where the near-field light is produced) toward the detector lens 12.

The returning light beams that have been reflected from the beam splitter 5 are condensed by the detector lens 12 and then is incident onto the detector 13. The intensity of the light incident on the detector 13 varies with how much light has returned from the area where the near-field light is produced. The quantity of that returning light varies according to the distance of the gap between the SIL 9 and the surface of the optical disc medium 1. Specifically, if the SIL 9 is perfectly in contact with the surface of the optical disc medium 1, then the quantity of the ongoing light that has been incident onto the SIL 9 and then transmitted through the optical disc medium 1 becomes maximum, and therefore, the quantity of the returning light becomes minimum. On the other hand, if the SIL 9 is sufficiently away from the surface of the optical disc medium 1, then no near-field light will reach the optical disc medium 1, and therefore, the ring portion of the ongoing light that has been incident on the SIL 9 is totally reflected and the quantity of the returning light becomes maximum. And if their gap is halfway between these two extremes, the quantity of the returning light varies substantially proportionally to the magnitude of the gap between the SIL 9 and the optical disc medium 1. That is why if the near-field light reaches the optical disc medium 1, the magnitude of the gap between the SIL 9 and the optical disc medium 1 can be determined by detecting the quantity of light incident on the detector 13.

Hereinafter, it will be described how this apparatus 100 performs a control operation.

The system controller 14 controls the overall operation of the apparatus 100.

The spindle motor 15 rotates the optical disc medium 1. The rotation controller 16 controls the ON and OFF states of the rotation of the spindle motor 15 and also controls the rotational frequency thereof. The feed motor 17 moves the optical head 2 in the radial direction of the optical disc medium 1. The feed controller 18 drives the feed motor 17, thereby controlling the radial location on the optical disc medium 1 at which the SIL 9 of the optical head 2 is located.

The angle of rotation detector 22 and the radial location detector 23 detect the relative positions of the SIL 9 and the optical disc medium 1. Specifically, the angle of rotation detector 22 detects the angle of rotation of the spindle motor 15 and provides that information for the system controller 14. For example, the angle of rotation detector 22 may detect the angle of rotation based on a pulse signal, which is generated every time the spindle motor 15 completes one revolution, and the rotational frequency. The radial location detector 23 may monitor how much the feed motor 17 has turned, thereby determining the radial location at which the SIL 9 is now located. And based on the angle of rotation and the radial location determined, the system controller 14 can detect the relative positions of the SIL 9 and the optical disc medium 1. Also, if necessary, the system controller 14 may memorize the angle of rotation and the radial location determined in the storage section 24. For example, the location on the optical disc medium 1 at which the gap servo operation was started may be memorized.

By calling up those locations memorized from the storage section 24, the system controller 14 can see exact locations on the optical disc medium 1 where the gap servo operation has been started so far. And in newly starting a gap servo operation, the system controller 14 starts the gap servo operation at a different location on the optical disc medium 1 from any other location where the gap servo operation has ever been started. For example, the system controller 14 may start the gap servo operation at a different radial location from any other location where the gap servo operation has ever been started. Alternatively, the system controller may also start the gap servo operation at a different circumferential location from any other location where the gap servo operation has ever been started. Optionally, the radial and circumferential locations may be both different from the past ones.

By changing the portions to be irradiated with the laser light every time the gap servo operation is started, the same particular portion will never be irradiated with the laser light over and over again, and deterioration of the storage layer and other thin-film layers of the optical disc medium 1 can be minimized. Also, even if any particular portion of the optical disc medium 1 deteriorated when the gap servo operation was started in the past, the gap servo operation is newly started at a different location from that particular deteriorated portion, and therefore, can get done just as intended.

As for the locations where the gap servo operation has been started, both the locations where the gap servo operation could be started successfully and the locations where the gap servo operation failed to start are preferably memorized. Also, as the storage section 24 is a nonvolatile memory, those start locations memorized will also be retained even after the apparatus 100 is turned OFF. Optionally, the gap servo start locations may also be memorized along with the optical disc medium's own information (such as its ID) that has been retrieved from the optical disc medium 1. In that case, even if the optical disc medium 1 is once removed from the apparatus 100 and then loaded into the apparatus 100 again later, the locations where the gap servo operation has been started so far can also be known exactly.

As for the range of the past gap servo start locations to memorize, only the location where the gap servo operation was started last time, the locations where the gap servo operation was started last time and second last time, respectively, or even earlier locations could be included. It is preferable that those earlier locations be memorized because the probability of starting the gap servo operation at the same location can be further decreased in that case.

The laser driver 19 controls the ON and OFF states of the laser light emission from the laser light source 3 and the power of the laser light emitted.

The gap detector 20 generates an electrical signal (as a voltage value) representing the intensity of the light received at the detector 13. The gap controller 21 varies the drive current for the actuator 11 so that the electrical signal supplied from the gap detector 20 has a constant voltage value, thereby performing a servo control operation to keep the gap between the SIL 9 and the surface of the optical disc medium 1 constant.

Figure 2:
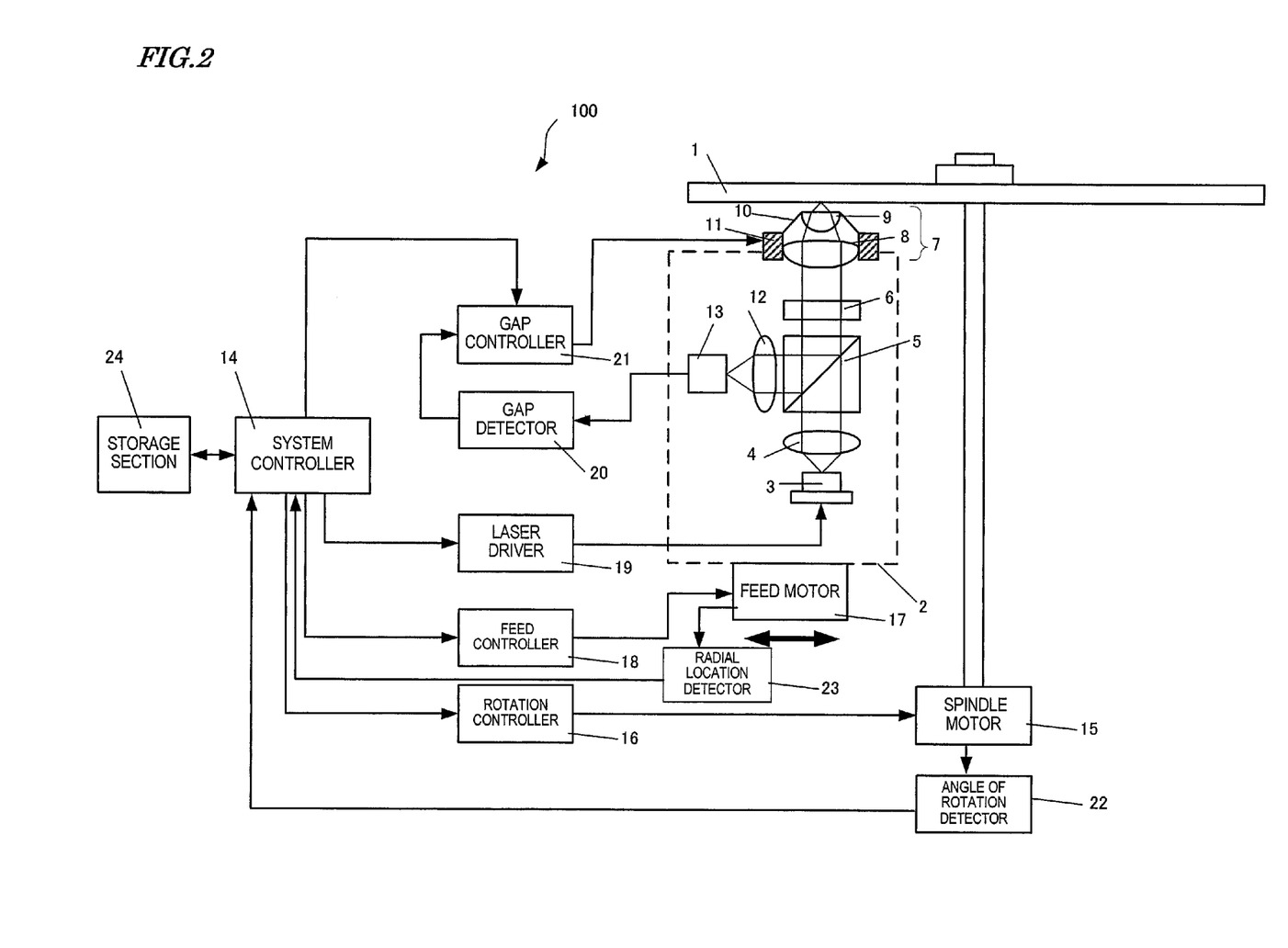
FIG. 2 is a block diagram illustrating an apparatus as a preferred embodiment of the present invention.

The apparatus 100 shown in FIG. 2 further includes a tracking controller, a read signal processor, a write pulse waveform generator and other circuits, but the description thereof will be omitted herein for the sake of simplicity. If necessary, any of those circuits may be added to an actual apparatus in an arbitrary combination.

Figure 3:
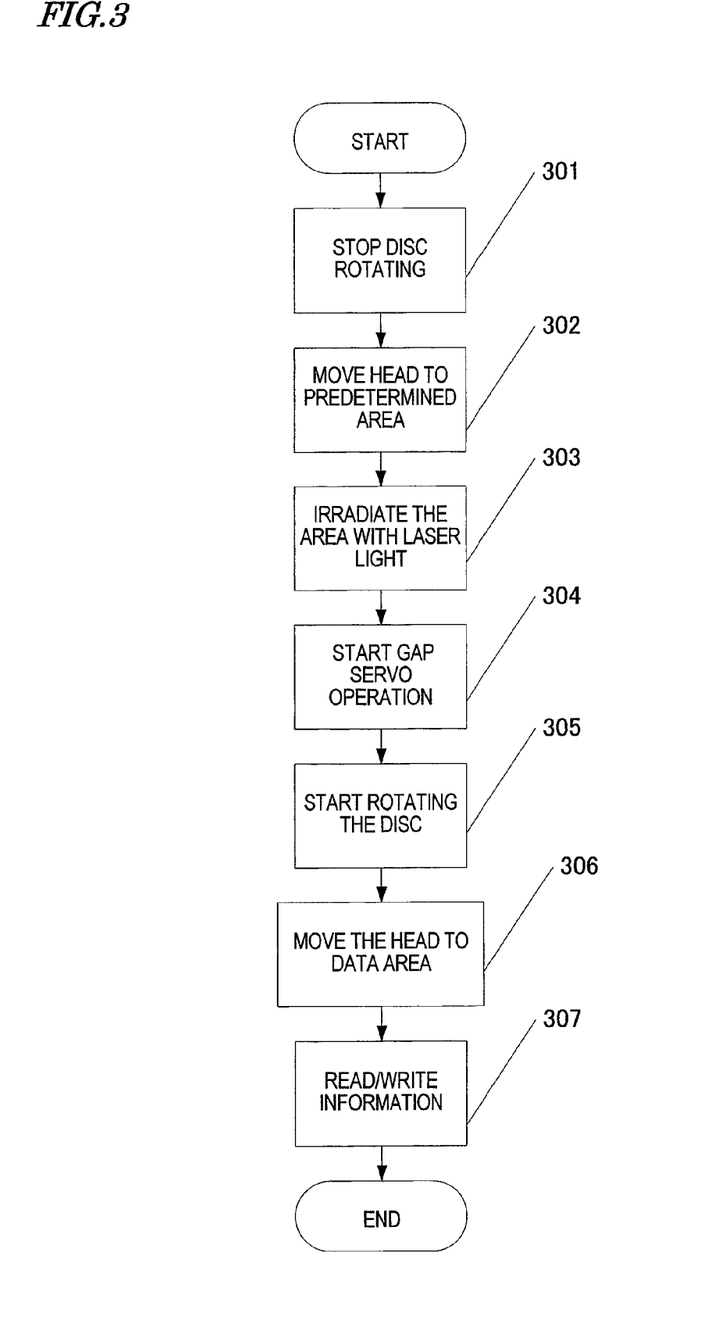
FIG. 3 is a flowchart illustrating how an apparatus according to a preferred embodiment of the present invention operates.

Next, it will be described in further detail with reference to FIGS. 1 through 3 exactly how the apparatus 100 operates. FIG. 3 is a flowchart illustrating the procedure of the operations to be performed by the apparatus 100.

At the START of the flowchart shown in FIG. 3, the gap between the SIL 9 and the surface of the optical disc medium 1 is still not narrow enough to get a read/write operation done using near-field light. The apparatus 100 may assume such a state just after the apparatus 100 has been turned ON, just after the apparatus 100 in the standby state has been activated, just after the apparatus 100 has been loaded with the optical disc medium 1, or just after the apparatus 100 has removed the dust from the surface of the optical disc medium 1 before starting reading and/or writing data from/on it.

In the "START" state, the system controller 14 signals the rotation controller 16 to reset the rotational frequency of the spindle motor 15 to zero (in Step 301). If the optical disc medium 1 is now rotating, the rotation controller 16 instructs the spindle motor 15 to stop rotating the optical disc medium 1. On the other hand, if the optical disc medium 1 is now stopped, then the rotation controller 16 maintains that state. It should be noted that if it is clear that the optical disc medium 1 is not rotating but stopped in the "START" state, this processing step 301 could be omitted.

Next, the system controller 14 signals the feed controller 18 to make the SIL 9 face the gap servo area 103 (in Step 302). In response, the feed controller 18 drives the feed motor 17, thereby moving the optical head 2 in the radial direction.

Subsequently, the system controller 14 signals the laser driver 19 to energize the laser light source 3 with a laser power value for reading (which will be referred to herein as "readout power") (in Step 303). In response, the laser driver 19 makes the laser light source 3 emit laser light with the readout power.

Thereafter, the system controller 14 signals the gap controller 21 to control the gap between the SIL 9 and the surface of the optical disc medium 1 to a predetermined value that is narrow enough to perform a read/write operation using near-field light (in Step 304). If there is a wide gap between the SIL 9 and the surface of the optical disc medium 1, then the gap controller 21 performs the control operation by bringing the SIL 9 toward the surface of the optical disc medium 1 and maintaining a predetermined gap once it has been reached. Conversely, if the gap between the SIL 9 and the surface of the optical disc medium 1 is shorter than the predetermined gap (including a situation where the gap is zero or they are in contact with each other), then the gap controller 21 performs a control operation by taking the SIL 9 away from the surface of the optical disc medium 1 and maintaining a predetermined gap once it has been reached.

As described above, by detecting the intensity of the light that has been incident on the detector 13, the magnitude of the gap between the SIL 9 and the surface of the optical disc medium 1 can be detected. Thus, the gap detector 20 generates an electrical signal representing the intensity of the light that has been incident on the detector 13. And the gap controller 21 controls the gap in accordance with the electrical signal supplied from the gap detector 20. In this manner, the gap is controlled based on the intensity of the light that has been incident on the detector 13.

At this point in time, the condensed laser beam irradiates and heats a particular portion of the gap servo area 103 of the optical disc medium 1 stopped. However, since the gap servo area 103 is arranged separately from the data area 101, even data stored in the data area 101, if any, would never be affected by the laser light.

Next, the system controller 14 signals the rotation controller 16 to change the rotational frequencies of the spindle motor 15 to a non-zero predetermined value (in Step 305). In response, the rotation controller 16 drives the spindle motor 15, thereby increasing the rotational velocity of the optical disc medium 1 to a predetermined value. As a result of this operation, the condensed laser beam will never continue irradiating the same particular portion, and therefore, the heat generated by the laser light with the readout power can be reduced to a negligible level (that is too low to affect the information stored in the data area 101 even if such laser light irradiated the data area 101).

Subsequently, the system controller 14 signals the feed controller 18 to move the SIL 9 to a radial location within the data area 10 on the optical disc medium 1 (in Step 306). In response, the feed controller 18 drives the feed motor 17 to move the SIL 9 to that radial location. Optionally, the SIL 9 may be moved in this processing step to a location with a predetermined address while reading the address information that is stored on the optical disc medium 1.

Thereafter, the data area 101 is irradiated with near-field light at any desired location, thereby reading or writing data from/on it (in Step 307).

Optionally, in the processing steps 306 and 307, the SIL 9 may be moved to a radial location within the management area 102 to read the management information first, and then moved to the data area 101 to read or write data from/on it.

As described above, as the gap control operation is started with the optical disc medium 1 kept stopped, the SIL 9 is much less likely to collide against, and get damaged by, the surface of the optical disc medium 1 when the gap control operation is started.

In addition, since the gap is detected by an optical technique, the configuration of the optical head 2 can be simplified and the manufacturing cost of the apparatus can be reduced.

On top of that, since the gap control operation is started in the gap servo area 103 that is arranged separately from the data area 101, the data stored in the data area 101 is never affected by the laser light. As a result, no data will be erased by mistake or the storage layer and other thin-film layers in the data area 101 will never deteriorate.

In the processing step 301 described above, the optical disc medium 1 is supposed to stop rotating. This is because the influence of disturbances can be minimized in that case during the gap control operation. Optionally, the gap control operation could be started with the optical disc medium 1 rotated at such a rotational velocity that is too low to interfere with the start of a gap control operation, and then the rotational velocity could be increased in Step 305.

Also, in the processing step 302 described above, the feed motor 17 is driven to move the SIL 9 of the optical head 2 to a radial location within the gap servo area 103. However, if the SIL 9 has already reached that radial location within the gap servo area 103 in the "START" state, this processing step may be omitted.

Furthermore, in the preferred embodiment described above, the laser light source 3 is supposed to be kept OFF until the processing step 303 is started. This is because if the laser emission is suspended in the "START" state, the power dissipation of the apparatus can be reduced in the standby mode or in the OFF state. As the laser light source 3 should be emitted to a power level that is high enough to obtain a detection signal by the time the processing step 304 is started, the laser light source 3 could be turned ON before the processing step 303 is started. For example, the laser light source 3 could start emitting laser light with very low power after the apparatus has been turned ON.

Furthermore, in the preferred embodiment described above, the gap servo area 103 is supposed to be provided independently of the other areas of the optical disc medium 1. Alternatively, the management area 102 could also be used as the gap servo area 103. In that case, the data area 101 could have an increased area and the storage capacity could be increased.

Also, since the gap servo area 103 is arranged adjacent to the management area 102, the interval between a point in time when the gap servo operation is started and a point in time when the SIL 9 is moved to the management area 102 can be shortened. As a result, the apparatus can get ready to actually read or write data more quickly. However, if an optical disc medium with no management area 102 or a read/write method that does not need to retrieve information from the management area 102 before reading or writing data is adopted, then the gap servo area 103 does not have to be located close to the management area 102.

In a more preferred embodiment, the management area 102 is arranged closer to the inner edge of the optical disc medium 1 than the data area 101 is, and the gap servo area 103 is arranged closer to that inner edge than the management area 102 is. That is to say, the gap servo area 103, the management area 102 and the data area 101 are arranged in this order outward from the inner edge of the optical disc medium 1. With such an arrangement, data can start being read or written as soon as the management information has been retrieved, thus further shortening the latency between a point in time when the apparatus is turned ON and a point in time when the apparatus gets ready to read or write data. On top of that, since the inner area on the disc is subjected to smaller mechanical vibrations such as disc flutter than the outer area, the influence of disturbances can be further reduced when the gap control operation is started. Naturally, areas for other uses may be interposed between these areas. For example, a test write area could be interposed between the management area 102 and the data area 103. Even so, the effect of shortening the latency can also be achieved by arranging those area in the order described above.

In the processing step 303 described above, the laser power is supposed to be readout power. However, as long as the level of the power is high enough to obtain a detection signal (i.e., to get the gap control operation done), the power may also be lower than the readout power. That is to say, the intensity of the laser light emitted from the laser light source 3 when the gap servo operation is started may be lower than the intensity when data is read. If only the power can be increased to a sufficiently high level before a read/write operation is started in Step 307, the read/write operation can get done just as intended. In that case, even if it has taken a while to start rotating the disc after the gap servo operation has been started, the thin-film layers in the gap servo area 103 are still much less likely to deteriorate.

Furthermore, even if the optical disc medium 1 is a read-only one, the gap servo area 103 is preferably provided separately from the data area 101. This is because in that case, even if it has taken a long time to start rotating the disc after the gap servo operation has been started, it is also possible to avoid an unwanted situation where the thin-film layers in the data area 101 have deteriorated too much to read data accurately.

Furthermore, in the processing step 303 described above, a predetermined area of the optical disc medium 1 stopped is supposed to be irradiated with laser light. However, the spot where that laser beam is incident is preferably changed every time the gap servo operation is started. This is because if the same particular portion of the optical disc medium 1 in the stopped position is irradiated with the laser light a number of times, the storage layer and other thin-film layers could also deteriorate, even in a situation where no data is stored in that portion.

As described above, if the locations on the optical disc medium 1 where the gap servo operation has been started so far are memorized by the storage section 24, the system controller 14 can see those locations where the gap servo operation has been started, and instructs the rotation controller 16 and the feed controller 18 to start the gap servo operation at a different location from any of the memorized ones. Every time the gap servo operation is started, the start location may be shifted either by a regular step and/or a regular angle or even randomly. The laser light spot to form initially when the gap servo operation is started can be easily shifted by moving and stopping the SIL 9 in the radial location within the gap servo area 103 before the laser light is emitted. Alternatively, such a shift can also be made by rotating and stopping the optical disc medium 1 before being irradiated with the laser light.

Also, by using the SIL 9, the condensing section 7 increases the NA and forms a very small spot, thereby getting a read/write operation done with high density. However, the condensing section 7 does not have to have such a configuration. Alternatively, the condensing section 7 may also includes any other component (such as an optical filter probe) that brings the condensing section 7 close to the surface of optical disc medium 1 with a gap of several to several hundreds nm left between them to perform a read/write operation with high density using near-field light.

EXAMPLES

Hereinafter, specific preferred embodiments of the present invention will be described based on more specific results of experiments.

As the substrate of the optical disc medium 1, a polycarbonate substrate with spiral tracks (or grooves) was used. The grooves were arranged at an interval of 250 nm and had a depth of 20 nm. On this substrate, deposited were a number of thin-film layers, including a phase change storage layer, by sputtering process. These thin-film layers had a four-layer structure consisting of an Ag alloy layer, a ZnS—$SiO_2$ dielectric layer, a GeSbTe phase change storage layer, and a ZnS—$SiO_2$ dielectric layer that had been stacked in this order on the substrate.

The gap servo area 103 was defined so as to spread from a radial location of 22.0 mm through a radial location of 22.9 mm. The management area 102 was defined so as to spread from a radial location of 23.0 mm through a radial location of 23.9 mm. And the data area 101 was defined so as to spread from a radial location of 24.0 mm through a radial location of 58.0 mm.

The laser light source 3 had an oscillation wavelength of 405 nm. A hemispheric SIL was used as the SIL 9. The condenser lens 8 and the SIL 9 had a combined NA of 1.84.

As the actuator 11, the spindle motor 15, the feed motor 17, the rotation controller 16, the feed controller 18, the laser driver 19 and the system controller 14, members for an optical disc tester that would use far-field light (not near-field light) were used. As for the gap detector 20 and the gap controller 21, circuits that would perform the operations described above were fabricated.

The apparatus 100 shown in FIG. 2 further includes a tracking controller, a read signal processor, a write pulse waveform generator and other circuits, but the description thereof will be omitted herein for the sake of simplicity. As for those circuits, members for an optical disc tester that would use far-field light were also used.

The experiments were carried out in the following manner. First of all, data was written on a part of the data area 101. Specifically, an optical disc medium 1, of which the data area 101 was still unrecorded, was mounted on the shaft of the spindle motor 15. The feed motor 17 was driven to move the optical head 2 to a radial location of 25.0 mm within the data area 101. The disc was not rotating but stopped and the power of the laser light was adjusted to a readout power of 0.2 mW. Then, a gap servo operation was performed with the gap between the SIL 9 and the surface of the optical disc medium 1 controlled to 30 nm by the gap controller 21. Thereafter, the spindle motor 15 was driven to start rotating the optical disc medium 1 at a linear velocity of 2.5 m/s and then a tracking servo operation was started.

With a channel clock cycle Tw set to be 15 ns, write pulses were generated to have a period of 8 T so that recording marks and space were formed alternately. By setting the recording and erasure powers of the laser light to be 5.0 mW and 2.0 mW, respectively, the emission waveform of the laser light was modulated using the write pulses, thereby forming recording marks and spaces at a period of 8 Tw over the entire radial range of 25.0 mm through 25.4 mm.

After the write operation was finished, the data written was read with the power of the laser light decreased to a readout power of 0.2 mW again. As a result, the 8 Tw period read signal had a C/N ratio of 52 dB. Thus, it could be seen that recording marks had been formed at a sufficient level.

Furthermore, when data continued to be read from the same single track for an hour with the optical disc medium standing still, the C/N ratio never decreased. Thus, it was discovered that if data was read from the optical disc medium 1 of this example being rotated at a velocity of 2.5 m/s, the data stored was never erased.

Next, with the tracking servo operation suspended and the gap servo operation continued, the optical disc medium 1 rotating was stopped by the rotation controller 16. No sooner had the optical disc medium 1 stopped entirely, the optical disc medium 1 started being rotated again, and the rotational frequency was set so that the linear velocity became 2.5 m/s. Then, with the tracking servo activated again, data was read from the recorded area ranging from a radial location of 25.0 mm through a radial location of 25.4 mm and the envelope of the read signal was monitored. As a result, a track on which the signal amplitude decreased locally was found. Consequently, it was discovered that if the gap servo operation was performed on the data area 101 with the optical disc medium 1 stopped, part of the data stored was erased.

Thereafter, the gap servo operation was once suspended, the laser light source 3 was turned OFF, the optical disc medium 1 rotating was stopped, and then the optical head 2 was moved by the feed motor 17 to a radial location of 22.0 mm within the gap servo area 103, in which no recording marks had been formed.

Then, with the optical disc medium 1 still stopped, the laser light source 3 was turned ON at that radial location with a power of 0.2 mW, thereby resuming the gap servo operation again. When a predetermined amount of time T passed after that, the gap servo operation was suspended and the laser light source 3 was turned OFF.

Next, the optical disc medium 1 was turned to approximately one degree to shift the beam spot and the time T was varied to carry out the same sequence again. As used herein, the sequence refers herein to a series of processing steps of turning ON the laser light source 3, starting the gap servo operation, suspending the gap servo operation when the time T passed, and turning OFF the laser light source 3.

After that, the optical disc medium 1 was rotated and irradiated with the laser light and the tracking servo operation was started again. And a track near the irradiated portion was scanned to monitor the read signal and see if there was any local variation in reflectance. The following Table 1 summarizes the results obtained by that monitoring. In Table 1, ○ indicates that there was no variation in reflectance and x indicates that there was a local variation in reflectance:

TABLE 1

| Time T | Variation in reflectance at the irradiated portion |
|---|---|
| 1 minute | ○ |
| 5 minutes | ○ |
| 10 minutes | ○ |
| 30 minutes | X |
| 60 minutes | X |

The results shown in Table 1 reveal that if the time T was 10 minutes or less, no local variations in reflectance occurred and the storage layer or other thin-film layers never deteriorated.

To sum up, the present inventors discovered that if the gap servo operation was performed within the gap servo area 103, (1) no data stored should be erased because there were no recording marks there in the first place, and (2) the storage layer or any other thin-film layer never deteriorated if the optical disc medium 1 started rotating within 10 minutes after the gap servo operation was finished.

These results reveal that by starting the gap control operation in the gap servo area 103 with the optical disc medium 1 stopped and then by starting to rotate the optical disc medium 1 immediately after that, no data stored in the data area 101 would be erased and the storage layer in the gap servo area 103 would not deteriorate, either.

In the example described above, the optical disc medium 1 including thin-film layers that were stacked on a substrate was used. Alternatively, an optical disc medium 1, of which the thin-film layers are covered with a protective layer, may also be used. Hereinafter, such an alternative optical disc medium 1 will be described with reference to FIGS. 4(a) and 4(b).

Figure 4:
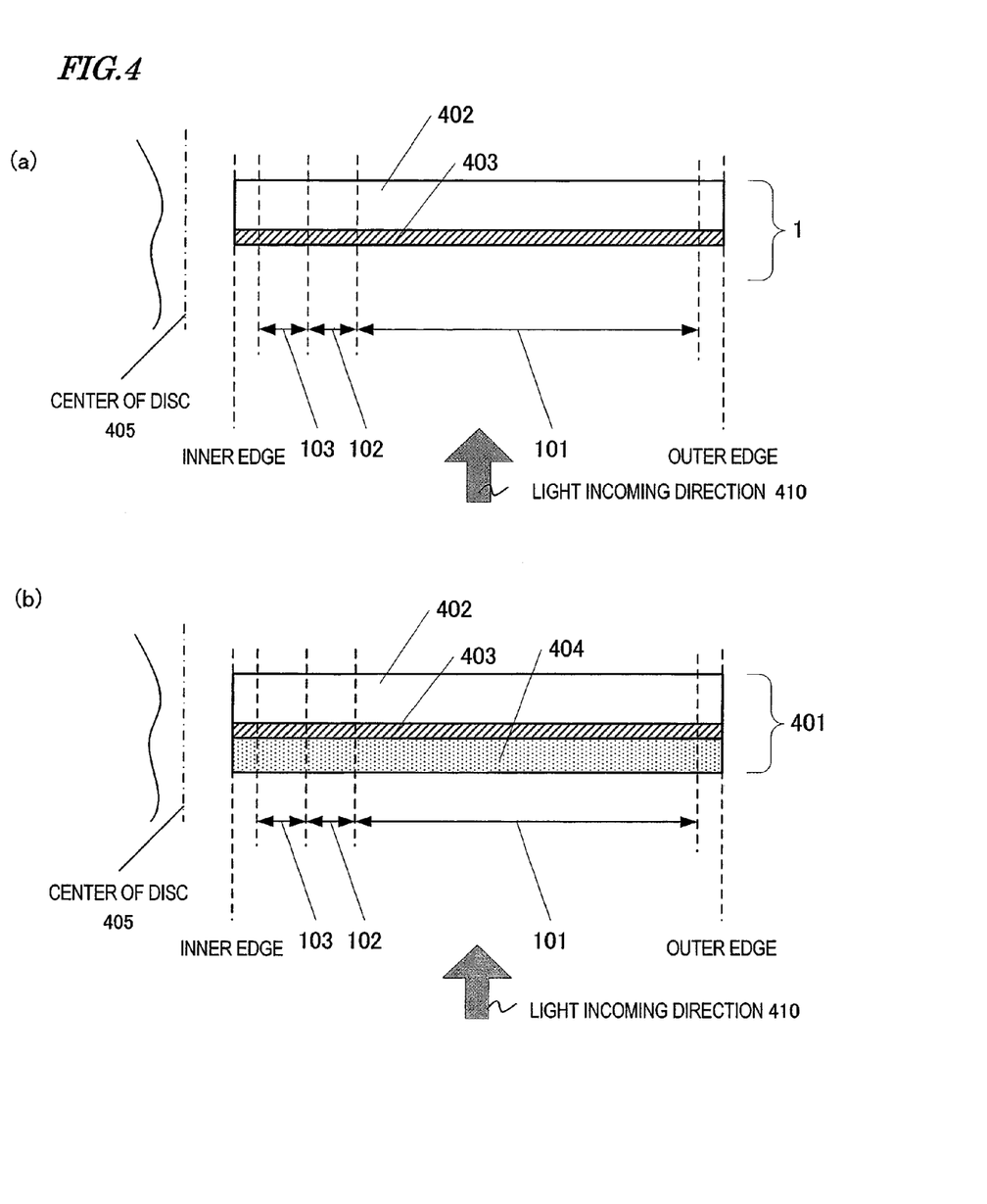
FIGS. 4(a) and 4(b) are cross-sectional views illustrating an information recording medium as a preferred embodiment of the present invention.

FIG. 4(a) illustrates a cross-sectional structure of the optical disc medium 1 with no protective layer, in which thin-film layers 403 are just stacked on a substrate 402. On the other hand, FIG. 4(b) illustrates a cross-sectional structure of an optical disc medium 401 with a protective layer. In the optical disc medium 401, the thin-film layers 403 thereof are covered with a protective layer 404. By covering the surface of the optical disc medium 401 with the protective layer 404, the surface of the optical disc medium 401 will not get scratched or no foreign matter will be deposited thereon.

The cross sections illustrated in FIGS. 4(a) and 4(b) are located on the right-hand side with respect to the center axis 405 of the optical disc medium. Laser light is incident on the optical disc medium in the incoming direction 410. In the optical disc medium 401 shown in FIG. 4(b), the protective layer 404 preferably has the same refractive index, and also preferably has the same thickness, in the gap servo area 103 and in the data area 101. In that case, when near-field light reaches the optical disc medium 401, the quantity of the returning light will vary with the magnitude of the gap in quite the same way between the gap servo area 103 and the data area 101. As a result, when the condensing section 7 is moved to the data area 101 after the gap has been controlled, there will be no need to adjust the degree of the gap servo control all over again.

It should be noted that the reading and writing conditions described above are just examples and could be naturally modified into appropriate ones according to the property of the given apparatus or medium.

In the preferred embodiments described above, a phase change material is supposed to be used as a recording film material for a write-once or rewritable medium. However, the present invention is in no way limited to those specific preferred embodiments. Any other material, including pigments and magneto-optical materials, could be used as long as recording marks can be formed there.

Optionally, even if the apparatus and method for reading and writing described above is applied to a personal computer, a server computer, a recorder, or a semiconductor device, similar effects will also be achieved.

Industrial Applicability

The present invention is applicable particularly effectively to the field of technology in which data is read and/or written using near-field light.

The invention claimed is:

1. An apparatus for reading and/or writing data from/on an information recording medium using near-field light, the apparatus comprising:
    a light source for emitting laser light;
    a condensing section for producing the near-field light based on the laser light;
    a detecting section for detecting the relative positions of the condensing section and the information recording medium; and
    a control section for controlling the position of the condensing section,
    wherein, when a gap servo operation is started anew, the control section controls the position of the condensing section so that the gap servo operation is started at a different location on the information recording medium from any other location where any past instance of the gap servo operation was started.

2. The apparatus of claim 1, further comprising a storage section for memorizing the locations where the gap servo operation has been started so far,
    wherein in starting the gap servo operation, the control section calls up the locations that are memorized by the storage section and controls the position of the condensing section so that the gap servo operation is started at a different location from any of the locations that have been called up from the storage section.

3. The apparatus of claim 1, wherein in starting the gap servo operation, the control section controls the position of the condensing section so that the gap servo operation is started at a different radial location from any other location where the gap servo operation has ever been started.

4. The apparatus of claim 1, wherein in starting the gap servo operation, the control section controls the position of the condensing section so that the gap servo operation is started at a different circumferential location from any other location where the gap servo operation has ever been started.

5. The apparatus of claim 1, wherein the control section starts the gap servo operation while the information recording medium is not rotating but stopped.

6. The apparatus of claim 1, wherein when the gap servo operation is started, the light source starts emitting the laser light with the information recording medium stopped.

7. The apparatus of claim 1, further comprising a motor for rotating the information recording medium,
    wherein when the gap servo operation is started, the motor rotates the information recording medium at a lower velocity than when data is read and/or written from/on the information recording medium.

8. The apparatus of claim 1, wherein it is not until the condensing section has reached the location where the gap servo operation is started that the light source starts emitting the laser light.

9. The apparatus of claim 1, wherein the control section starts the gap servo operation after having moved the condensing section to a position where the condensing section faces a predetermined area on the information recording medium.

10. The apparatus of claim 9, wherein the predetermined area is a management area in which management information is stored to manage the information recording medium.

11. The apparatus of claim 9, wherein the information recording medium has a management area in which management information is stored to manage the information recording medium, and
    wherein the predetermined area is adjacent to the management area.

12. The apparatus of claim 9, wherein the information recording medium has a management area in which management information is stored to manage the information recording medium and a data area to store user data, and wherein the management area is located closer to the inner edge of the information recording medium than the data area is, and wherein the predetermined area is located closer to the inner edge of the information recording medium than the management area is.

13. The apparatus of claim 9, wherein the information recording medium is either a write-once recording medium or a rewritable recording medium, and wherein the predetermined area has no recording marks.

14. The apparatus of claim 9, wherein the information recording medium is either a write-once recording medium or a rewritable recording medium, and wherein the predetermined area has no grooves.

15. The apparatus of claim 9, wherein the information recording medium is a read-only recording medium, and wherein the predetermined area has no recording pits.

16. The apparatus of claim 1, wherein the condensing section includes a solid immersion lens.

17. The apparatus of claim 1, wherein the intensity of the laser light emitted by the light source is lower when the gap servo operation is started than when data is read from the information recording medium.

18. A method for reading and/or writing data from/on an information recording medium using near-field light, the method comprising the steps of:

detecting the relative positions of the information recording medium and a condensing section; and controlling, when a gap servo operation is started anew, the position of the condensing section so that the gap servo operation is started at a different location on the information recording medium from any other location where any past instance of the gap servo operation was started.

* * * * *